United States Patent [19]

Nozemack

[11] 4,332,699
[45] Jun. 1, 1982

[54] CATALYST PREPARATION

[75] Inventor: Richard J. Nozemack, Lutherville, Md.

[73] Assignee: W. R. Grace & Co., New York, N.Y.

[21] Appl. No.: 167,297

[22] Filed: Jul. 10, 1980

[51] Int. Cl.³ .............................................. B01J 29/08
[52] U.S. Cl. ................................................ 252/455 Z
[58] Field of Search .................................... 252/455 Z

[56] References Cited

U.S. PATENT DOCUMENTS

| 3,542,670 | 11/1970 | Erickson | 252/455 Z |
| 3,629,152 | 12/1971 | Lindsley et al. | 252/455 Z |
| 3,650,988 | 3/1972 | Magee, Jr. et al. | 252/455 Z |
| 3,677,973 | 7/1972 | Mitsche et al. | 252/455 Z |

*Primary Examiner*—Carl F. Dees
*Attorney, Agent, or Firm*—Arthur P. Savage

[57] ABSTRACT

Zeolite containing cracking catalysts are prepared by combining an alumina stabilized crystalline zeolite with an inorganic oxide matrix. The alumina stabilized zeolite is obtained by precipitating hydrous alumina onto a finely divided zeolite under alkaline reaction conditions.

15 Claims, 1 Drawing Figure

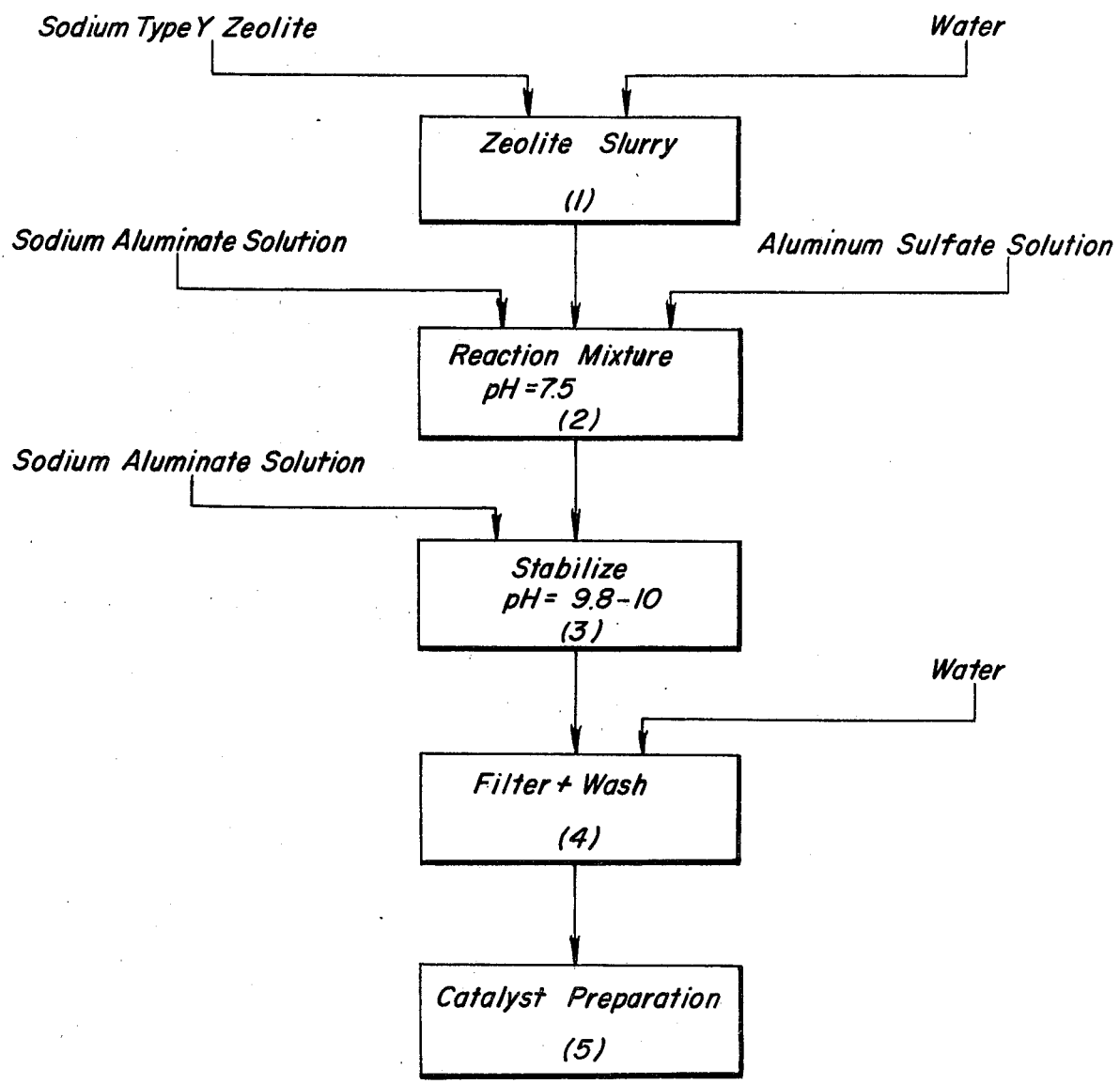

CATALYST PREPARATION

The present invention relates to a method for preparing zeolite containing hydrocarbon conversion catalysts, and more specifically to a method for preparing alumina stabilized catalytic cracking catalysts which are particularly selective for the production of high octane gasoline fractions.

Hydrocarbon conversion catalysts which contain zeolites are prepared by combining a finely divided crystalline zeolite, such as synthetic faujasite, with amorphous inorganic oxide matrix materials such as amorphous silica, alumina and silica alumina sols and gels and/or clay. Typical preparation procedures involve combining the zeolite component with either a pregelled matrix component or gelling the matrix components in the presence of the zeolite. The zeolite which is incorporated in the catalyst may be stabilized by exchange with hydrogen and/or polyvalent metal ions prior to or after incorporation into the matrix. To obtain a fluidized catalyst, a slurry of the matrix and zeolite is spray dried to obtain finely divided microspheroidal particles in the range of about 50 to 200 microns. To obtain larger particulate catalysts the zeolite and matrix component may be granulated or pilled.

U.S. Pat. No. 3,542,670 to Erickson et al discloses a method for preparing a catalyst wherein silica-alumina hydrogel, hydrous alumina, and crystalline alumina silicate zeolite are combined and dried to form particulate cracking catalyst. The hydrous alumina component is prepared by precipitating alumina at alkaline pH by mixing aluminum sulfate with sodium aluminate in aqueous solution, or by adding a base such as alumina to aluminum sulfate solution. The addition of the alumina component stabilizes the overall catalyst composition with respect to steam deactivation.

U.S. Pat. No. 3,562,148 to Mitsche describes preparation of hydrocarbon conversion catalysts wherein zeolite is mixed with an alumina hydroxylhalide sol having a pH of 3 to 5, gelling the mixture by a reaction with a gelling agent such as hexamethylenetetraamine to form gelled particles, and calcining the gelled particles to obtain a catalyst which comprises zeolite suspended in an alumina matrix.

U.S. Pat. No. 3,753,929 to Lindsley describes preparation of an alumina coated catalyst composition wherein a zeolite/silica-alumina gel mixture is combined with alumina sulfate, sodium aluminate at a pH of 3 to 5.

U.S. Pat. No. 3,956,104 to Hilfman discloses an alumina/zeolite composite catalyst which is prepared by combining a zeolite with a solution of soluble aluminum sulfate partial hydrolysis product having a pH of about 4, and then precipitating alumina at a pH of about 8.5 by the addition of ammonium hydroxide.

U.S. Pat. No. 3,974,099 to Lussier et al discloses the preparation of zeolite/silica-alumina hydrogel catalyst which contain an excess of precipitated alumina. The excess alumina improves the hydrothermal stability of the gel catalyst.

The above noted references indicate that the inclusion of alumina in hydrocarbon conversion catalyst compositions is beneficial, particularly from the standpoint of improving stability.

It is an object of the present invention to provide an improved method for preparing alumina containing catalyst compositions.

It is another object to provide a method by which the zeolite component of a hydrocarbon conversion catalyst may be economically and effectively stabilized against thermal deactivation.

It is still another object to provide an economical zeolite-alumina containing cracking catalyst which is particularly selective for the production of high octane gasoline fractions.

These and further objects of the invention will become readily apparent to one skilled in the art from the following detailed description and drawing wherein the FIGURE is a flow diagram of a process that illustrates the practice of the invention.

Broadly, my invention contemplates the preparation of alumina-zeolite containing catalyst wherein alumina is precipitated directly on the zeolite component from an alkaline reaction medium, and the alumina coated zeolite is then incorporated into an inorganic oxide matrix.

More specifically, I have found that zeolites which are used in the preparation of hydrocarbon conversion catalysts may be quickly and economically prepared by combining an aqueous slurry zeolite with aqueous solutions of aluminum salts at a pH of from about 7 to 8 precipitate alumina on the zeolite, then adjusting the pH of the mixture to a pH of about 9 to 11 by the addition of a base to stabilize the alumina, and recovering the alumina coated zeolite which preferably contains from about 20 to 50 percent by weight precipitated alumina. The alumina coated zeolite is then combined with a suitable matrix, such as silica, silica-alumina sols and hydrogels, and clay, and mixtures thereof form stable, highly active hydrocarbon conversion catalysts.

A more clear understanding of my invention may be obtained by reference to the drawing wherein the FIGURE represents a flow diagram of a process which incorporates the invention. In step (1), a zeolite slurry containing from about 5 to 10 weight percent solids is formed by combining a sodium type Y zeolite and water. The resulting zeolite slurry is then combined with sodium aluminate solution and aluminum sulfate solution in amounts wherein the overall reaction mixture at step (2) has a pH of about 7.5. The sodium aluminate solution preferably contains from about 10 to 20 percent by weight $Al_2O_3$ with a mole ratio of 1.4:1 $Na_2O:Al_2O_3$. The aluminum sulfate solution preferably contains from about 2 to 7.5 percent by weight alumina as aluminum sulphate which has the formula $Al_2(SO_4)_3$. The quantity of sodium aluminate solution and aluminum sulfate solution added at step (2) is sufficient to provide from about 15 to 40 percent alumina as $Al_2O_3$ on the zeolite contained in the reaction mixture.

Preferably the reaction mixture in step (2) is held at a temperature of from about 20° to 56° C. from a period of 30 to 120 minutes under constant agitation. During this time the alumina contained in the added salt solutions precipitates upon the surface of the zeolite component.

The reaction mixture obtained in step (2) is combined at step (3) with additional sodium aluminate solution to obtain an overall reaction mixture pH of about 9.8 to 10. The reaction mixture of step (3) is held at a temperature of from 20° to 50° C. for from about 10 to 30 minutes whereupon the alumina initially precipitated at step (2) is stabilized. Preferably, the sodium aluminate added at step (3) will add from about 4.2 to 10.5 percent by weight additional alumina to the zeolite component. While sodium aluminate is added at step (3) it is also contemplated that the pH adjustment required for stabilization of the precipitated alumina may be obtained by the addition of other bases such as sodium hydroxide or ammonium hydroxide.

Subsequent to the stabilization of step (3) the reaction mixture is filtered at step (4) and washed with water to remove soluble salts. The aluminum coated zeolite obtained at step (4) is then included in a conventional catalyst preparation wherein the aluminum coated zeolite is combined with an inorganic oxide matrix.

While the process illustrated in the FIGURE utilizes a sodium type Y zeolite, it is also contemplated that other zeolites such as type X, ZSM-5, ZSM-11, silicalite, mordenite, ferrierite or rare earth exchanged zeolite may be used. In general the preferred zeolites are crystalline aluminosilicates which possess uniform pore structures and silica-alumina ratios above 3. The zeolites are preferably stabilized by ion exchange with hydrogen or polyvalent metal atoms. One particularly preferred type of zeolite is obtained by exchanging a sodium type Y zeolite is with ammonium sulfate to lower the soda content to a level below about 4 percent. Furthermore, catalyst compositions may be prepared which contain thermally stabilized zeolites such as type Z-14 US zeolite as prepared in U.S. Pat. Nos. 3,293,192 and 3,449,070 or calcined rare earth exchanged zeolites such as prepared in U.S. Pat. Nos. 3,595,611 and Re. 28,629.

In the preferred practice of the invention, the aluminum salts which provide the alumina comprise a combination of sodium aluminate and aluminum sulfate. However, it is contemplated that other acid aluminum salts, such as aluminum chloride or aluminum nitrate may be utilized. Furthermore, an acid aluminum salt may be combined with an inorganic base such as sodium hydroxide or ammonium hydroxide to provide the desired reaction mixture which precipitates alumina onto the zeolite. Furthermore, it is anticipated that the stabilization reaction which involves increase of the pH to a level of about 9.0 to 11.0 may be achieved by the addition of an inorganic base such as sodium hydroxide and ammonium hydroxide. The filtering and washing step is conveniently conducted using water to remove soluble salts. It is also contemplated that wash/exchange solutions of acids or bases on salts such as ammonium sulfate may be used to achieve the desired removal of soluble salts. Furthermore, it is contemplated that the aluminum coated zeolite reaction mixture which results from the coating process may be directly utilized in a catalyst preparation procedure.

The catalyst preparation procedures by which the alumina coated zeolite is incorporated in a matrix are described in the prior art. Typical procedures are disclosed in U.S. Pat. Nos. 3,650,988 and 3,912,619 to Magee, et al, as well as U.S. Pat. No. 3,957,689 to Ostermaier et al. Typical catalyst preparation procedures involve combining the alumina coated zeolite with a matrix which comprises silica-alumina hydrogel or silica sol and clay. Typical catalyst compositions comprise from about 10 to 40 percent zeolite and from about 15 to 60 percent silica-alumina hydrogel or silica sol and from about 50 to 30 percent by weight clay. In addition, these catalyst compositions may contain additional alumina from amounts ranging from about 5 to 30 percent and/or oxidation promoters such as platinum in amounts ranging from about 2 to 100 parts per million by weight. The oxidation promoter and alumina components serve to oxidize and recover carbon monoxide and/or sulfur oxides which are produced during a typical catalytic cracking operation.

The catalysts obtained by the practice of my invention are found to be particularly effective for converting petroleum hydrocarbons such as gas oil, to lower molecular weight products, such as fuel oil and gasoline. The catalytically cracked gasoline fractions produced using the present catalysts are found to possess octane ratings of from about 86.9 to 89.0 Research Octane Number (77.2-78.3 Motor Octane Number) after steam deactivation.

Having described the basic aspects of my invention, the following specific examples are given to illustrate preferred embodiments thereof.

EXAMPLE I

The following procedure was used to produce 15.8 lbs. of alumina-cladded zeolite which comprised 2 parts by weight zeolite and 1.16 parts by weight alumina.

1. Slurry 12,770 g of ammonium exchanged Y-type zeolite (37% solids filter cake, ~4% $Na_2O$) in 21½ gal. $H_2O$. Heat slurry (5% solids) to 120° F.
2. Continuously add 14# sodium aluminate solution (~50° C., 20% $Al_2O_3$) and 20# alum solution (~30° C., 7.5% $Al_2O_3$) under agitation over a period of fifty minutes such that the pH of the slurry remains between 7.4-7.6 pH.
3. Add 7.5# additional sodium aluminate to batch to stabilize at 9.8-10.0 pH.
4. Filter slurry.
5. Wash filter cake with 20 gal. of 140° F. $H_2O$.

| ANALYSES: | | | |
|---|---|---|---|
| Total Volatiles @ 1750° F. | 77.78 wt % | Surface Area | 537 $m^2/g$ |
| $Al_2O_3$ | 44.85 wt % | Pore Volume ($N_2$) | .38 cc/g |
| $Na_2O$ | 7.42 wt % | | |
| $SO_4$ | 4.62 wt % | | |

EXAMPLE II

The following procedure was used to prepare 30.72 lbs# of microspheroidal cracking catalyst having the formulation:

25 wt % $SiO_2.Al_2O_3$ sol binder
47.4 wt % zeolite of Example I
27.6 wt % kaolin (1) 61 lbs of aqueous sodium silicate solution containing 2.6 wt. % $SiO_2$ and 3.88 wt. % $Na_2O$ was mixed with 19 lbs acid-aluminum sulfate solution (63% by wt. 20% $H_2SO_4$ solution and 37% by wt. $Al_2(SO_4)_3$ solution containing 7.5 $Al_2O_3$) to obtain 80 lbs of silica-alumina sol having a pH of 3.0 at 23° C.

(2) 8.49 lbs of kaolin (dry basis) was mixed with the sol of step (1) with intense agitation.

(3) 74.5 lbs of the alumina-clad zeolite of Example I was slurried with 14 lbs of $H_2O$. The slurry was adjusted to 4.0 pH by addition of 1800 ml of 20% $H_2SO_4$ solution.

(4) The slurry of step (3) was added to the mixture of step (2) with intense mixing to obtain a composition having a pH of 3.2 at 23° C.

(5) The composition of step (4) was spray dried at 325° F. (outlet temperature) to form microsphere particles.

(6) The spray dried microspheres were washed-exchanged with ammonium sulfate solution to obtain a catalyst having the composition set forth in Example III.

EXAMPLE III

The catalyst of Example II was analyzed and evaluated using standard catalytic cracking activity test procedures.

| Chemical Analysis | |
|---|---|
| Total Volatiles @ 1750° F. | 16.04 wt % |
| $Al_2O_3$ | 37.28 wt % |
| $Na_2O$ | .79 wt % |
| $SO_4$ | 1.19 wt % |
| Physical Properties | |
| Approved Bulk Density/Comported Density | .73/.82 g/cc |
| Davison Index/Jersey Index | 8/1.2 |
| Pore Volume ($N_2/H_2O$) cc/g | .14/.23 |
| Average Particle Size | 49 microns |
| Cracking Activity | |
| Microactivity Activity after 1350° F. steaming | 69.1 vol. % |
| Gas Factor | 2.57 |
| Carbon Factor | .59 |

EXAMPLE IV

The catalytic cracking properties of the catalyst of Example II were compared with a similar catalyst which contains 17 wt % (silica-alumina basis) of a rare-earth exchanged type Y zeolite.
Pilot Unit Cracking Evaluation (40 WHSU, 4 c/o, 950° F.)

| | Example II (1520° F. Steam) | Comparison Catalyst (1350° F. Steam) |
|---|---|---|
| Conversion (Vol %) | 65.5 | 67.5 |
| $H_2$ (wt % FF) | 0.017 | 0.015 |
| $C_1 + C_2$ (wt % FF) | 1.09 | 0.88 |
| Total $C_3$ = (Vol % FF) | 7.2 | 6.1 |
| $C_3$ = (Vol % FF) | 6.1 | 4.6 |
| Total $C_4$ = (Vol % FF) | 13.5 | 8.9 |
| $C_4$ = (Vol % FF) | 6.1 | 3.2 |
| $iC_4$ = (Vol % FF) | 5.4 | 4.8 |
| $C_5$ + Gasoline (Vol % FF) | 55.5 | 62.0 |
| $C_5$ + gasoline/conversion | 0.85 | 0.92 |
| Research Octane Number | 88.0 | 84.0 |
| Motor Octane Number | 77.8 | 76.2 |
| Coke (Wt % FF) | 2.9 | 3.0 |

The above examples clearly illustrate that valuable hydrocarbon conversion catalysts may be obtained by the practice of my invention.

I claim:

1. A method for preparing a zeolite containing hydrocarbon cracking catalyst which is selective for the production of gasoline fractions comprising:
dispersing in an inorganic oxide matrix an alumina coated zeolite which is prepared by the process comprising:
   (a) preparing an aqueous slurry of finely divided zeolite,
   (b) continuously adding an acid aluminum salt solution and an alkali metal aluminate solution to said zeolite slurry under agitation to provide a reaction mixture wherein the pH remains at about 7 to 8 to precipitate hydrous alumina on said zeolite particles, and
   (c) adding a base to the reaction mixture to increase pH to a level of from about 9 to 11 to stabilize said alumina.

2. The method of claim 1 wherein said alumina coated zeolite is recovered from said reaction mixture and washed to remove soluble salts therefrom.

3. The method of claim 1 wherein said zeolite is a crystalline alumino silicate selected from the group consisting of type X, type Y, ZSM-5 and mixtures thereof.

4. The method of claim 1 wherein said aluminum salt solution is selected from the group consisting of aluminum sulfate, sodium aluminate and mixtures thereof.

5. The method of claim 1 wherein said base is selected from the group consisting of sodium aluminate and ammonium hydroxide.

6. The method of claim 1 where from about 20 to 50 percent by weight of alumina is precipitated on said zeolite.

7. The method of claim 1 wherein said inorganic oxide matrix contains amorphous silica, silica-alumina sols and hydrogels, clay and mixtures thereof.

8. A catalytic cracking catalyst composition which comprises:
an inorganic oxide matrix, and an alumina coated zeolite dispersed in said matrix which is prepared by the process comprising:
   (a) preparing an aqueous slurry of finely divided zeolite,
   (b) continuously adding an acid aluminum salt solution and an alkali metal aluminate solution to said zeolite slurry under agitation to provide a reaction mixture wherein the pH remains at about 7 to 8 to precipitate hydrous alumina on said zeolite particles, and
   (c) adding a base to the reaction mixture to increase pH to a level of from about 9 to 11 to stabilize said alumina.

9. The composition of claim 8 wherein said catalyst contains from 8 to 40 percent by weight of said alumina coated zeolite.

10. The method of claim 1 wherein said zeolite component obtained at step (b) contains from 15 to 40 weight percent alumina.

11. The composition of claim 8 which contains up to 50 percent by weight clay.

12. The method of claim 1 wherein the solutions added at step (b) are aluminum sulfate and sodium aluminate solutions.

13. The composition of claim 8 wherein the solutions added at step (b) are aluminum sulfate and sodium aluminate solutions.

14. The composition of claim 8 wherein said zeolite is a Type Y zeolite.

15. The composition of claim 14 wherein said zeolite is an ammonium exchanged Type Y zeolite.

* * * * *